(12) United States Patent
Anderson et al.

(10) Patent No.: US 12,019,189 B2
(45) Date of Patent: Jun. 25, 2024

(54) PROVIDING DYNAMIC FIELD OF VIEW FOR LIGHT RECEIVED FROM A DYNAMIC POSITION

(71) Applicant: Analog Devices, Inc., Norwood, MA (US)

(72) Inventors: Michael Howard Anderson, Lyons, CO (US); Scott Robert Davis, Denver, CO (US); Benjamin Luey, Denver, CO (US)

(73) Assignee: Analog Devices, Inc., Norwood, MA (US)

(*) Notice: Subject to any disclaimer, the term of this patent is extended or adjusted under 35 U.S.C. 154(b) by 1089 days.

(21) Appl. No.: 16/480,220

(22) PCT Filed: Jan. 24, 2018

(86) PCT No.: PCT/US2018/015027
§ 371 (c)(1),
(2) Date: Jul. 23, 2019

(87) PCT Pub. No.: WO2018/140480
PCT Pub. Date: Aug. 2, 2018

(65) Prior Publication Data
US 2019/0369216 A1    Dec. 5, 2019

Related U.S. Application Data

(60) Provisional application No. 62/449,716, filed on Jan. 24, 2017.

(51) Int. Cl.
*G01S 7/4863* (2020.01)
*G01S 7/481* (2006.01)
(Continued)

(52) U.S. Cl.
CPC .......... *G01S 7/4863* (2013.01); *G01S 7/4816* (2013.01); *G01S 7/4817* (2013.01); *G01S 17/42* (2013.01);
(Continued)

(58) Field of Classification Search
CPC .... G01S 7/4863; G01S 7/4816; G01S 7/4817; G01S 17/42; G01S 17/89; G01S 7/4861;
(Continued)

(56) References Cited

U.S. PATENT DOCUMENTS 6,301,003 B1   10/2001   Shirai et al.
7,532,311 B2   5/2009    Henderson et al.
(Continued)

FOREIGN PATENT DOCUMENTS

| CN | 101238393 A | 8/2008 |
|---|---|---|
| CN | 105452894 A | 3/2016 |

(Continued)

OTHER PUBLICATIONS

"International Application Serial No. PCT/US2018/015027, International Search Report mailed May 4, 2018", 5 pgs.
(Continued)

*Primary Examiner* — Luke D Ratcliffe
(74) *Attorney, Agent, or Firm* — Schwegman Lundberg & Woessner, P.A.

(57) ABSTRACT

A system and method for providing a dynamic composite field of view in a scanning lidar system, such as to improve a signal-to-noise ration of detected light. The dynamic composite field of view can include a subset of the available detector pixels, and can thereby reduce noise introduce by noise sources that can scale with a detector area, such as dark current and gain peaking that can be caused by a capacitance of the photodetector.

18 Claims, 5 Drawing Sheets

(51) Int. Cl.

| | | |
|---|---|---|
| *G01S 7/4861* | (2020.01) | |
| *G01S 7/487* | (2006.01) | |
| *G01S 17/00* | (2020.01) | |
| *G01S 17/06* | (2006.01) | |
| *G01S 17/42* | (2006.01) | |
| *G01S 17/89* | (2020.01) | |

(52) U.S. Cl.
CPC .............. *G01S 17/89* (2013.01); *G01S 7/4861* (2013.01); *G01S 7/487* (2013.01); *G01S 7/4876* (2013.01); *G01S 17/00* (2013.01); *G01S 17/06* (2013.01)

(58) Field of Classification Search
CPC ........ G01S 7/487; G01S 7/4876; G01S 17/00; G01S 17/06; G01S 7/4912
See application file for complete search history.

(56) References Cited

U.S. PATENT DOCUMENTS

| | | | | |
|---|---|---|---|---|
| 9,523,771 | B2 * | 12/2016 | Romano | ................ G06F 3/0304 |
| 2011/0261358 | A1 * | 10/2011 | Volanthen | ................. G01J 9/00 |
| | | | | 356/328 |
| 2012/0170029 | A1 | 7/2012 | Azzazy et al. | |
| 2015/0285625 | A1 | 10/2015 | Deane | |
| 2018/0113200 | A1 * | 4/2018 | Steinberg | ............. B60Q 1/0023 |
| 2018/0372873 | A1 * | 12/2018 | Koifman | ................. G01S 17/10 |

FOREIGN PATENT DOCUMENTS

| | | | |
|---|---|---|---|
| CN | 110268282 B | 11/2023 | |
| DE | 102011007133 A1 | 12/2011 | |
| DE | 112015001704 T5 | 12/2016 | |
| DE | 112018000284 B4 | 4/2023 | |
| EP | 2957926 A1 | 12/2015 | |
| WO | WO-2013183469 A1 * | 12/2013 | ........... G01N 23/083 |
| WO | WO-2014198629 A1 * | 12/2014 | ............. A63F 13/25 |
| WO | WO-2018140480 A1 | 8/2018 | |

OTHER PUBLICATIONS

"International Application Serial No. PCT/US2018/015027, Written Opinion mailed May 4, 2018", 5 pgs.
"Chinese Application Serial No. 201880008180.4, Office Action mailed Dec. 1, 2022", wo/ English Translation, 11 pgs.
"German Application Serial No. 112018000284.5, Office Action mailed Aug. 8, 2022", w/o English translation, 9 pgs.
"German Application Serial No. 112018000284.5, Response filed Nov. 8, 2022 to Office Action mailed Aug. 8, 2022", w/o English Claims, 42 pgs.
"German Application Serial No. 112018000284.5, Response filed Dec. 15, 2022 to Examiner Interview", 12 pgs.
"International Application Serial No. PCT/US2018/015027, International Preliminary Report on Patentability mailed Aug. 8, 2019", 7 pgs.
"Chinese Application Serial No. 201880008180.4, Office Action mailed May 9, 2023", W/O English Translation, 9 pgs.
"Chinese Application Serial No. 201880008180.4, Response filed Apr. 17, 2023 to Office Action mailed Dec. 1, 2022", w/ English Claims, 13 pgs.

* cited by examiner

PROVIDING DYNAMIC FIELD OF VIEW FOR LIGHT RECEIVED FROM A DYNAMIC POSITION

CLAIM OF PRIORITY

This patent is a National Stage Filing under 35 U.S.C. § 371 of International Patent Application Serial No. PCT/US2018/015027, filed Jan. 24, 2018, and published on Aug. 2, 2018 as WO 2018/140480 A1, which claims the benefit of priority of Provisional Patent Application Ser. No. 62/499,716, filed Jan. 24, 2017, each of which are hereby incorporated by reference herein in their entirety.

FIELD OF THE DISCLOSURE

The present disclosure relates to systems and methods for improving accuracy in a system receiving light from a moving source, such as in a scanning laser range finding system or free space optical communication system.

SUMMARY OF THE DISCLOSURE

Certain systems, such as lidar systems, can scan a light beam across a target region and detect the scanned light beam reflected or scattered by the target region. The inventors have recognized, among other things, that it is possible to provide a dynamic field of view as the light beam scans across the target region, such as can provide an improved signal-to-noise ratio of the detected light. Further features of the disclosure are provided in the appended claims, which features may optionally be combined with each other in any permutation or combination, unless expressly indicated otherwise elsewhere in this document.

In an aspect, the disclosure can feature a method for dynamically adjusting a composite field of view in a lidar system having a photosensitive detector. The method can include selecting a first group of detector pixels, such as for detecting a portion of a light beam transmitted towards a target region. The method can also include adjusting an angle of the light beam transmitted towards the target region. The method can also include then selecting a second group of detector pixels, such as for detecting a portion of the light beam having the adjusted angle. The method can also include subtracting at least one detector pixel from the first group of detector pixels and adding at least one detector pixel to the first group of detector pixels, such as to form the second group of detector pixels. The detected light beam can include an area corresponding to M pixels and the first group of detector pixels and the second group of detector pixels can include M+1 pixels, and the photosensitive detector can include N pixels, where N can be greater than M+1. The method can also include scanning the light beam over the target region in a pattern and recording the positions of the detected light beam using a full number N of detector pixels. The method can also include using the recorded positions of the detected light beam to select the first and second groups of detector pixels. The method can also include summing pixels in the first group of detector pixels prior to processing and summing pixels in the second group of detector pixels prior to processing. The method can also include summing pixels in the first group of detector pixels after processing and summing pixels in the second group of detector pixels after processing. The method can also include using the selected first group of detector pixels to detect a position of the light beam and selecting the second group of detector pixels when a center of the detected position of the light beam is at a boundary between two pixels in the first group of detector pixels. The method can also include scanning the light beam over the target region and determining an angle for each time the light beam crosses a boundary between two detector pixels using a full number N of detector pixels. The method can also include scanning the light beam over the target region and selecting a new group of M+1 detector pixels each time the angle of the light beam corresponds to one of the determined angles.

In an aspect, the disclosure can feature a system for dynamically adjusting a composite field of view in a lidar system. The system can include a transmitter configured to transmit a light beam towards a target region at a first angle and then at a second angle. The system can also include a photodetector including a plurality of pixels. The system can also include control circuitry configured to select a first group of detector pixels to receive a portion of the light beam at the first angle and a second group of detector pixels to receive a portion of the light beam at the second angle from the target region. The control circuitry can be configured to subtract at least one detector pixel from the first group of detector pixels and add at least one detector pixel to the first group of detector pixels, such as to form the second group of detector pixels. The received portion of the light beam can include an area corresponding to M detector pixels and the first group of detector pixels and the second group of detector pixels can include M+1 detector pixels, and the photosensitive detector can include N detector pixels, where N can be greater than M+1. The transmitter can be configured to scan the light beam over the target region in a pattern and the system can include a memory, such as to record the positions of the detected light beam using a full number N of detector pixels. The control circuitry can be configured to use the recorded positions of the detected light beam to select the first and second groups of detector pixels. The system can also include summing circuitry that can sum pixels in the first group of detector pixels prior to processing and can sum pixels in the second group of detector pixels prior to processing. The system can also include summing circuitry to sum pixels in the first group of detector pixels after processing and sum pixels in the second group of detector pixels after processing.

In an aspect, the disclosure can feature a method for dynamically adjusting a composite field of view in a lidar system. The method can include transmitting a light beam towards a target region. The method can also include receiving a responsive light beam from the target region onto a first group of pixels corresponding to a first composite field of view. The method can also include adjusting an angle of the transmitted light beam and, based on the adjusted angle of the transmitted light beam, removing at least one pixel from the first group of pixels and adding at least one pixel to the first group of pixels to form a second group of pixels corresponding to a second composite field of view. The method can also include then transmitting the light beam towards the target region at the adjusted angle and receiving a responsive light beam from the target region onto the second group of pixels corresponding to the second field of view. The method can also include sequentially scanning a light beam across a target region and determining at least one angle of the light beam at which a received portion of the transmitted light beam is aligned with a boundary of at least two pixels. The at least one angle of light beam can be determined when a center of the received portion of the transmitted light beam is aligned with a boundary of at least two pixels.

BRIEF DESCRIPTION OF THE DRAWINGS

The present disclosure will now be described, by way of example, with reference to the accompanying drawings, in which.

DETAILED DESCRIPTION OF EMBODIMENTS OF THE DISCLOSURE

Figure 1:
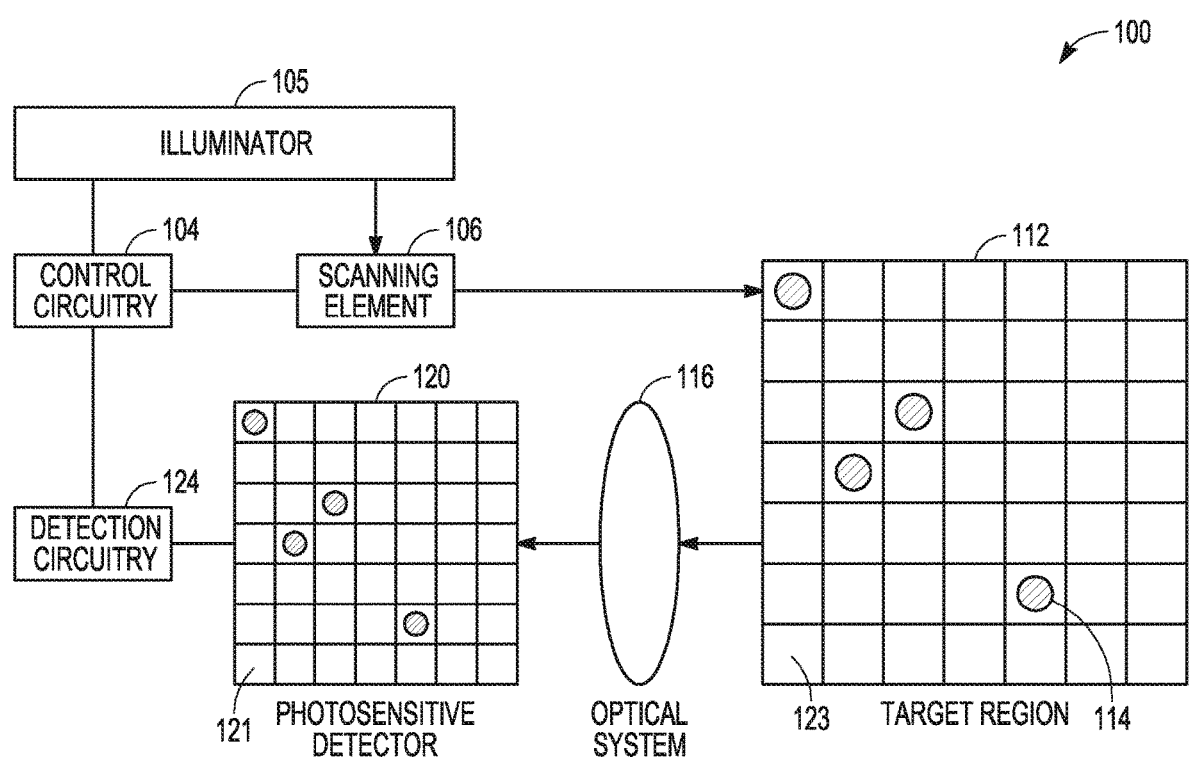
FIG. 1 illustrates a diagram of a scanning lidar system.

FIG. 1 shows an example of portions of a lidar system 100. The lidar system 100 can include control circuitry 104, an illuminator 105, a scanning element 106, an optical system 116, a photosensitive detector 120, and detection circuitry 124. The control circuitry 104 can be connected to the illuminator 105, the scanning element 106 and the detection circuitry 124. The photosensitive detector 120 can be connected to the detection circuitry 124. During operation, the control circuitry 104 can provide instructions to the illuminator 105 and the scanning element 106, such as to cause the illuminator 105 to emit a light beam towards the scanning element 106 and to cause the scanning element 106 to direct the light beam towards the target region 112. In an example, the illuminator 105 can include a laser and the scanning element can include a vector scanner, such as an electro-optic waveguide. The electro-optic waveguide can adjust an angle of the light beam based on the received instructions from the control circuitry 104. The target region 112 can correspond to a field of view of the optical system 116. The electro-optic waveguide can scan the light beam over the target region 112 in a series of scanned segments 114. The optical system 116 can receive at least a portion of the light beam from the target region 112 and can image the scanned segments 114 onto the photosensitive detector 120 (e.g., a CCD). The detection circuitry 124 can receive and process the image of the scanned points from the photosensitive detector 120, such as to form a frame. In an example, the control circuitry 104 can select a region of interest that is a subset of the field of view of the optical system and instruct the electro-optic waveguide to scan over the region of interest. In an example, the detection circuitry 124 can include circuitry for digitizing the received image. In an example, the lidar system 100 can be installed in an automobile, such as to facilitate an autonomous self-driving automobile. A field of view of the optical system 116 can be associated with the photosensitive detector 120, such as in which the optical system 116 images light onto the photosensitive detector 120. The photosensitive detector 120 can include and be divided into an array of detector pixels 121, and the optical system's field of view (FOV) can be divided into an array of pixel FOVs 123 with each pixel FOSS' of the optical system corresponding to a pixel of the photosensitive detector 120.

Figure 6:
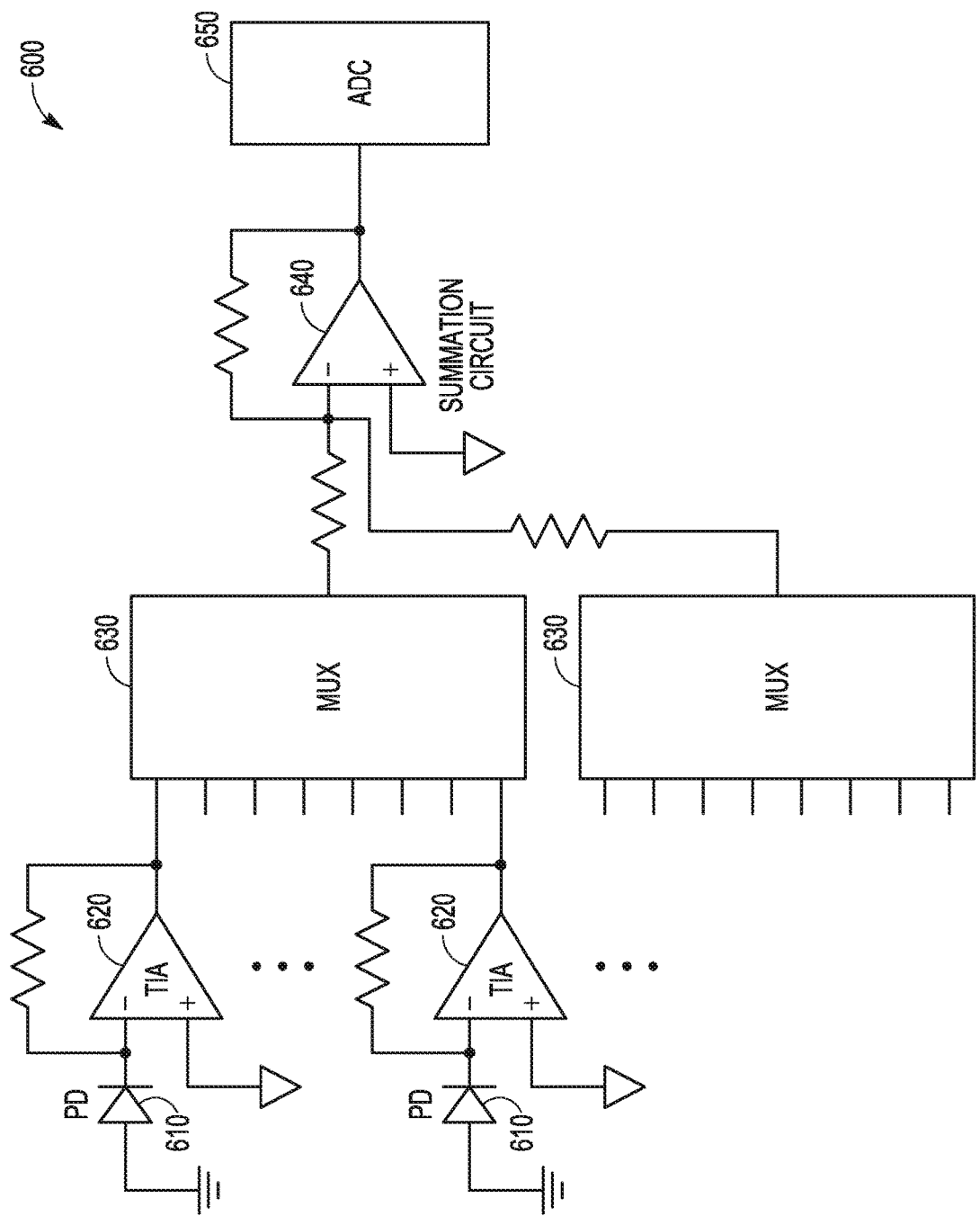
FIG. 6 illustrates a signal path in a scanned lidar system.

In an example, one or more signals (e.g., measured charge or current) from a group of detector pixels 121 can be summed together, such as to form a composite FOV (e.g., a sum of detector pixel FOVs). The composite FOV can be a subset of less than the full FOV. By changing which of the pixels are being summed together, the composite FOV can be adjusted dynamically. The summing can be done in various ways. For example, the summing can be performed digitally, such as after some processing of each pixel in the active composite FOV. The summing can also be performed by adding currents directly (e.g., by summing photocurrents directly from the photodiode, or by converting photocurrents to a voltage, such as with a transimpedance amplifier and then summing the voltages) from the photocurrent created by the light incident on the photodetector. The summing can also be performed with a summing amplifier later in the signal path, such as the signal path 600 shown in FIG. 6 that can include a photodetector (PD) 610 providing a signal to a transimpedance amplifier (TLA) 620, the transimpedance amplifier 620 providing a signal to a summation circuit 640 or second amplification stage, followed by an analog-to-digital converter (ADC) 650. A first and second multiplexer 630 can process even and odd detector pixels of the photosensitive detector, respectively. In an example where the detector pixels can be consecutively numbered, even detector pixels can refer to even numbered detector pixels and odd detector pixels can refer to odd numbered detector pixels.

In an example in which an image of the object of interest (e.g., a reflected or scattered portion of a light beam illuminating the target region) being detected can be smaller than the full FOV, reducing the FOV such as described herein can have numerous advantages. For example, by using a reduced. FOV for effectively reducing the active area of the photodetector, noise, such as that introduced by one or more noise sources that scale with an area of the photodetector can be reduced. Examples of noise or other artifacts that can be reduced by reducing the active area of the photodetector can include dark current in the photodetector and gain peaking in an operational-amplifier circuit, such as that caused by the capacitance of the photodetector. Additionally, the effect of background light can be reduced and any spurious light signals not present in the active composite FOV but present in the full system FOV can be reduced, and in some examples, eliminated.

Alternatively, or additionally, the signal from an individual pixel can be fully processed independently and then summing or one or more other techniques can be performed in post-processing. This can have the disadvantage of duplicating much of the full signal chain for each individual pixel (e.g., readout electronics for each individual pixel instead of readout electronics for as few as one composite pixel). This duplication can occur in hardware (and thus can result in heat generation and power consumption and physical space) or additionally, in software and data-processing, and in many circumstances, may not be feasible.

A problem that may be associated with dividing the photodetector into a subset of smaller regions of the photodetector can be that a signal of interest can be present between the FOVs of two (or more) pixels. In such an example, the observed signal may be reduced when reading a single pixel, because a substantial portion of the light can hit inactive pixels. By dynamically adjusting a composite FOV, this problem can be reduced while still maintaining the benefits of having a reduced FOV. In an example, a technique for summing pixels can include varying a composite FOV, such as to track a moving target (e.g., a light beam scanning over the target region) while fully capturing the light from the target. The composite FOV can be dynamically adjusted, such as based on one or more of a location of the target, the size of the target, and a calibration of the FOV for each pixel. In an example, the composite FOV can be automatically adjusted when the target spans a boundary between at least two pixels.

Figure 2:
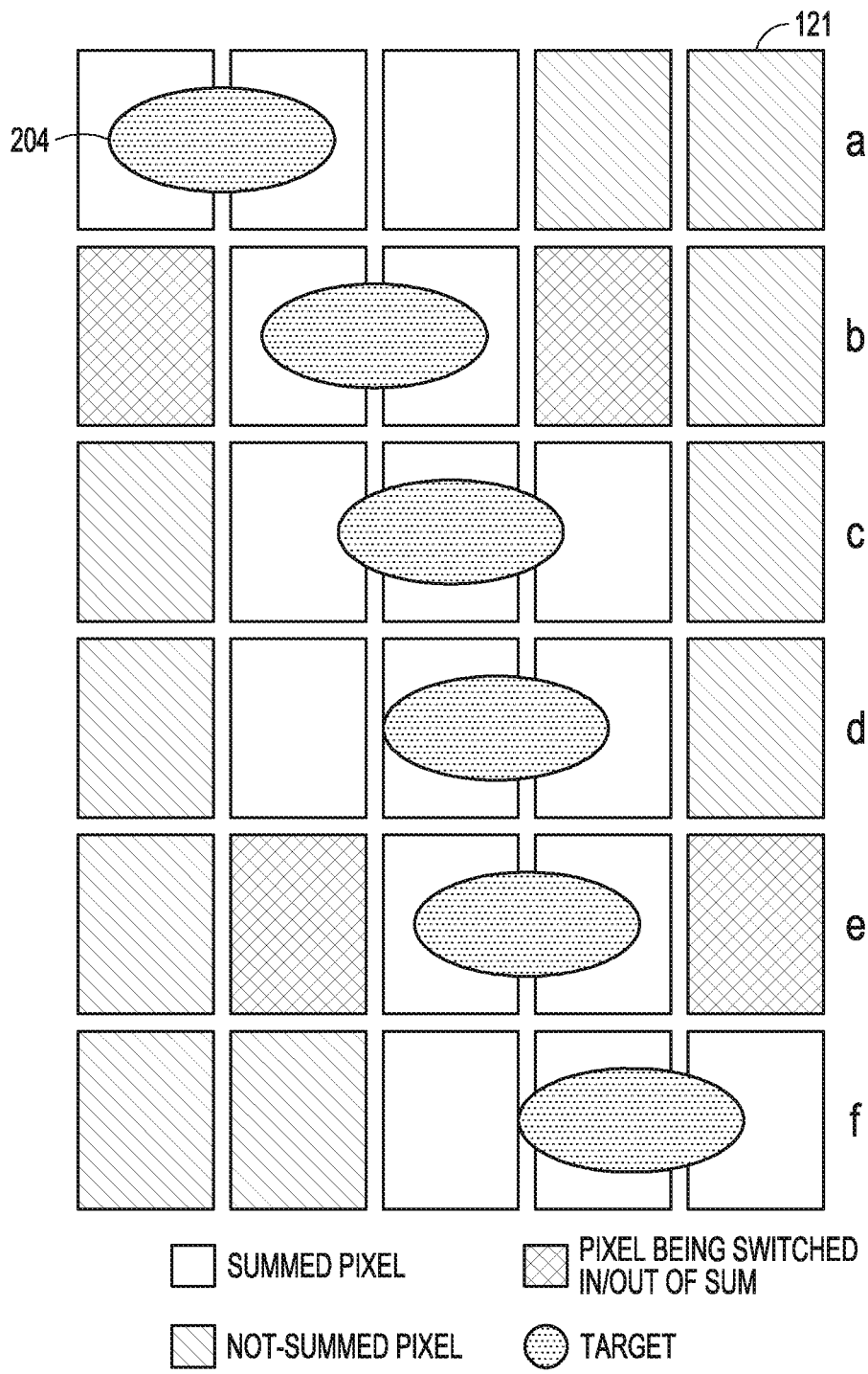
FIG. 2 illustrates a diagram of a method for dynamically adjusting a composite FOV.

FIG. 2 illustrates a method for dynamically adjusting a composite FOV in a lidar system, such as the lidar system 100 shown in FIG. 1. In the illustrated method, which has been simplified to include a small number (e.g., less than 10) of detector pixels 121 merely for illustrative clarity, the photosensitive detector can include five detector pixels 121, the target 204 can have a dimension along the scanning direction of larger than one detector pixel, but smaller than two detector pixels, and three detector pixels at a time can be summed to form a composite FOV. The detector pixels being summed can be unshaded as illustrated in FIG. 2. In the illustrated method, the target (e.g., a reflected or scattered portion of a light beam illuminating the target region) can move from left to right (from a low pixel index to a high pixel index), across the five detector pixels of the photosensitive detector as the light beam scans across a target region. As the target moves from left to right, the composite FOV can be dynamically adjusted, such as to provide for capture of the entire target by the detector pixels forming the composite FOV. In an example, the pixel having the lowest index can be removed from the sum of detector pixels forming the composite FOV and the next pixel in the target direction of motion (e.g., higher index) can be added to the sum of detector pixels forming the composite FOV, such as when the target is centered or otherwise spans two of the detector pixels in the composite FOV. In an example, the photosensitive detector can include N detector pixels, a size of a target can be captured by m detector pixels, and a composite FOV can be formed by summing m+1 detector pixels. In the example shown in FIG. 2, the target can move in a linear pattern, but the technique of dynamically adjusting the composite FOV can be applied to an arbitrary pattern in one or two dimensions, so long as the arbitrary pattern can be determinable in advance. Additionally, or alternatively, the technique of summing pixels to form a composite FOV can be applied in one or two dimensions.

In a scanning lidar system, such as that shown in FIG. 1, the target can be imaged by a light pulse emitted by the laser that can be reflected or scattered back from the target region to the receiving optical system. The target position can be determined based on an angle at which the light pulse can be emitted from the laser, such as to determine a pattern of the target based on the scan pattern of the laser.

In an example in which the target can be brighter than any background signals, such as in an active lidar system as shown in FIG. 1, or in a free-space optical communication system, the position of the target can be determined from the corresponding signals collected by each respective detector pixel in the composite FOV. In an example in which the target image hits only two detector pixels, a difference in signal strength of each individual detector pixel can be used to determine a target position relative to the two pixels. By adjusting which pixels are being summed and the corresponding composite FOV when the signal strength is balanced or divided between two detector pixels, the pixel switching can be handled automatically in real time.

In an example in which the target changes direction, the change in direction of the target can be detected based on the signal strengths of each pixel. In such an example in which the motion of the target can be slow compared with the update rate of the detector pixel signals, the lidar system can track the motion of the target. A position of the target can be determined by image processing either data from the photosensitive detector or data from another sensor or a suite of sensors, such as cameras, inertial measurement units (IMUs), or GPS.

Figure 3:
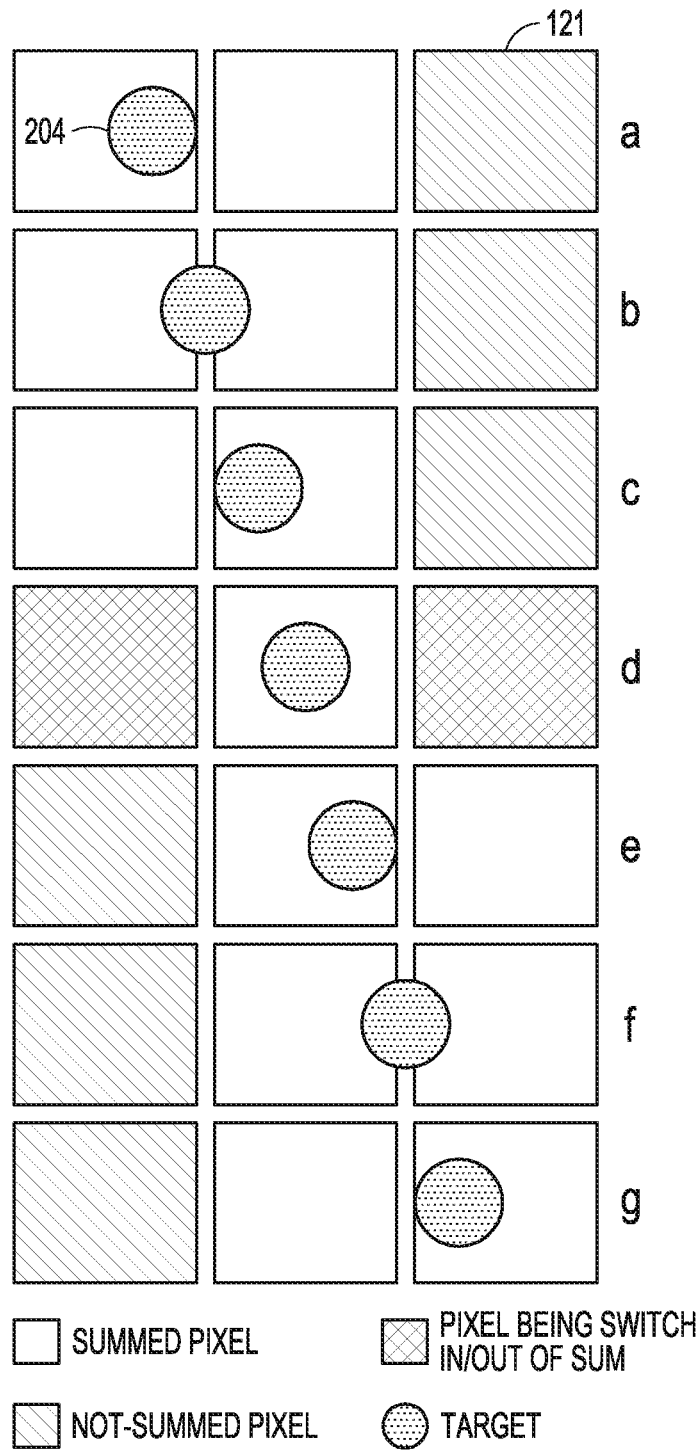
FIG. 3 illustrates a diagram of a method for dynamically adjusting a composite FONT.
Figure 4:
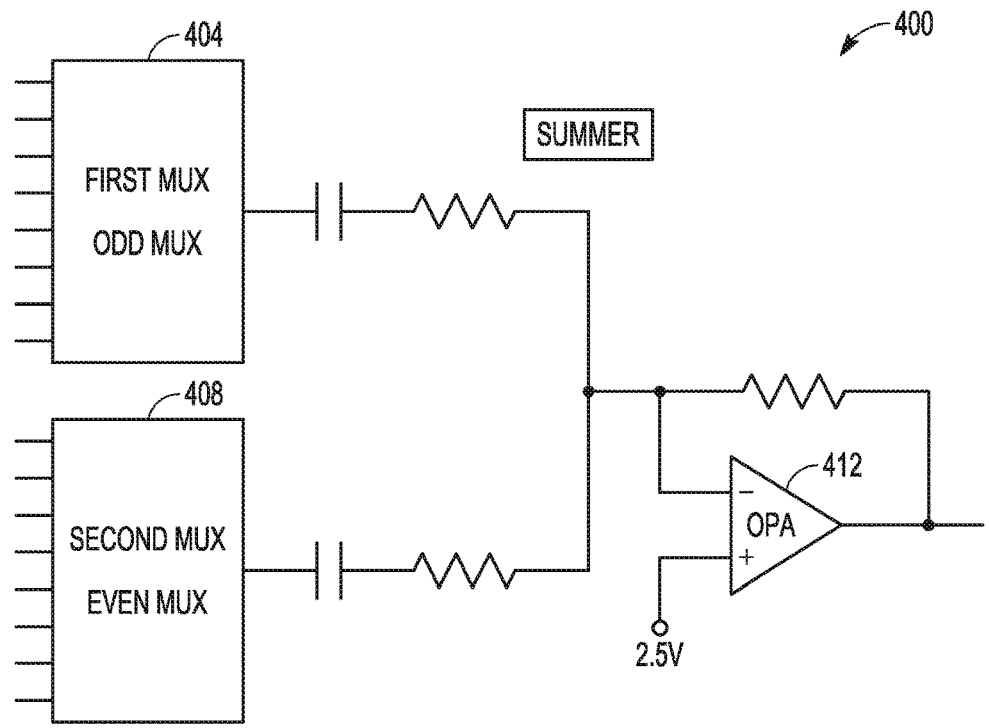
FIG. 4 illustrates a diagram of an electrical system for dynamically adjusting a composite FOV.

FIG. 3 illustrates an example in which a size of the target beam can be less than a single detector pixel. In the example shown in FIG. 3, two detector pixels at a time can be summed to form a composite FOV. In such an example in which two adjacent detector pixels are summed to form a composite FOV, FIG. 4 illustrates an example of an electronic system 400 for performing the summing. The electronic system 400 can be included in detection circuitry, such as detection circuitry 124. In the example shown in FIG. 4, odd pixels can be electrically connected to the inputs of a first multiplexer 404 (MUX) and even pixels can be electrically connected to the inputs of a second multiplexer 408. The outputs of the first multiplexer 404 and the second multiplexer 408 can be connected to a summing amplifier 412, such as to sum any combination of adjacent pixels (e.g., pixel one and pixel two or pixel two and pixel three). In an example in which N detector pixels at a time can be summed to form a composite FOV, the detector pixels can respectively be connected to the inputs of N multiplexers, and the outputs of the respective multiplexers can be summed to form a composite FOV.

In an example in which a composite FOV is less than a full FOV, the composite FOV can be matched to a dynamic area of interest. Matching the dynamic area of interest to the composite FOV can lower noise and make the system less susceptible to spurious signals that are outside the current composite FOV of the photodetector. For example, in a scanned lidar system, direct sunlight or other strong light sources may blind or saturate a few detector pixels, but if these blinded or saturated pixels aren't active detector pixels, then the system may not be blinded or saturated by this signal. Increased noise from a non-blinding light source may also be avoided in an example in which the noise from the non-blinding light source can be incident on inactive detector pixels not in the active composite FOV. In an example in which the composite FOV includes a single detector pixel, a received signal may be reduced when the target moves outside of single pixel's FOV and is split between multiple pixels.

Figure 5:
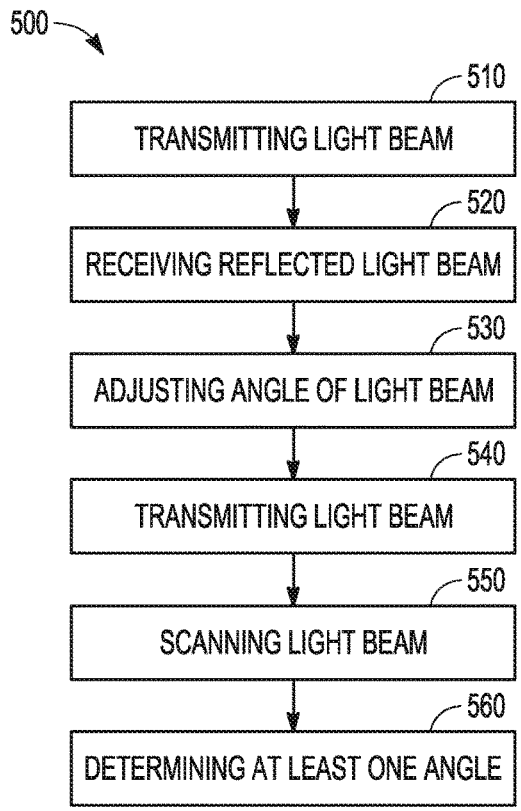
FIG. 5 illustrates a method of operation of a scanning lidar system.

FIG. 5 illustrates a method of operation of a scanning lidar system, such as the lidar system 100 shown in FIG. 1. A light beam can be transmitted towards a first target (step 510). A reflected or scattered light beam can then be received from the first target onto a first group of pixels corresponding to a first composite field of view (step 520). An angle of the light beam transmitted from the laser can be adjusted and based on the adjusted angle of the transmitted light beam, at least one pixel can be removed from the first group of pixels and at least one pixel can be added to the first group of pixels to form a second group of pixels (step 530). The removing of at least one pixel and adding of at least one pixel may be referred to as a pixel handoff. A light beam can then be transmitted towards a second target and a reflected light beam can be received from the second target onto the second group of pixels corresponding to a second field of view (step 540). A light beam can be scanned across a target region and at least one angle can be determined based on where a received portion of the transmitted light beam can be aligned with a boundary of at least two pixels (steps 550 and 560). In an example, a center of the received portion of the transmitted light beam can be aligned with a boundary of at least two pixels.

In an example where pixel handoffs can be associated with an angle of a light beam transmitted by an illuminator, such as the illuminator 105 shown in FIG. 1, the pixel handoffs can be used as calibrated angle markers, such as to provide an indication of changes in a beam steering portion (e.g., scanning element 106) of a scanning lidar system. The pixel handoffs can be used to provide recalibration of the beam steering portion and can be used to compensate for drift in the beam steering portion, such as due to aging, misalignment, mechanical impact, temperature drift, laser wavelength drift, or any other factor that can affect the beam steerer. Although some of the examples herein have been described in the context of a lidar system, the disclosure is equally applicable to passive receive systems such as free space optical communication systems.

The invention claimed is:

1. A method for dynamically adjusting a composite field of view in an optical detection system having a photosensitive detector, the method comprising:
   scanning a first light beam over a target region in a pattern and recording positions of the detected first light beam using a count N of detector pixels;
   selecting a first group of detector pixels comprising a first composite field of view for detecting a portion of a second light beam transmitted towards the target region;
   summing the first group of detector pixels including summing at least two pixels in the first group of detector pixels in the analog domain prior to a digitization;
   adjusting an angle of the second light beam transmitted towards the target region; and
   selecting a second group of detector pixels comprising a second composite field of view for detecting a portion of the second light beam having the adjusted angle;
   summing the second group of detector pixels including summing at least two pixels in the second group of detector pixels in the analog domain prior to another digitization, the selecting the first group of detector pixels and the selecting the second group of detector pixels including using the recorded positions of the detected first light beam, a count of the first group of detector pixels and a count of the second group of detector pixels being less than the count N.

2. The method of claim 1, comprising subtracting at least one detector pixel from the first group of detector pixels and adding at least one detector pixel to the first group of detector pixels to form the second group of detector pixels.

3. The method according to claim 1, wherein the detected second light beam has an area corresponding to M pixels and the first group of detector pixels and the second group of detector pixels include M+1 pixels, and the photosensitive detector includes N pixels, where N is greater than M+1.

4. The method according to claim 1, comprising summing every pixel in the first group of detector pixels in the analog domain prior to the digitization and summing every pixel in the second group of detector pixels in the analog domain prior to the other digitization.

5. The method according to claim 1, comprising summing at least two pixels or summed pixel groups in the first group of detector pixels after the digitization and summing at least two pixels or summed pixel groups in the second group of detector pixels after the other digitization.

6. The method according to claim 1, comprising using the first group of detector pixels to detect a position of the second light beam and selecting the second group of detector pixels when a center of the detected position of the second light beam is at a boundary between two pixels.

7. The method according to claim 1, comprising scanning the first light beam over the target region and determining respective angle for each time the light beam crosses a boundary between two detector pixels using a full count N of detector pixels.

8. The method according to claim 7, comprising scanning the second light beam over the target region and selecting a new group of M+1 detector pixels each time the angle of the light beam corresponds to a respective one of the determined respective angles.

9. A system for dynamically adjusting a composite field of view in an optical detection system, the system comprising:
   a transmitter configured to transmit a second light beam towards a target region at a first angle and then at a second angle;
   a photodetector including a plurality of pixels; and
   control circuitry configured to:
   record positions of a detected first light beam scanned over the target region in a pattern using a count N of the plurality of photodetector pixels;
   select a first group of the plurality of photodetector pixels comprising a first composite field of view to receive a portion of the second light beam corresponding to the first angle and a second group of the plurality of photodetector pixels comprising a second composite field of view to receive a portion of the second light beam corresponding to the second angle from the target region, the selecting the first group and the selecting the second group including using recorded positions of the detected first light beam, a count of the first group of the plurality of photodetector pixels and a count of the second group of the plurality of photodetector pixels being less than the count N; and
   summing circuitry, configured to sum the first group of detector pixels including to sum at least two pixels in the first group of photodetector pixels in the analog domain prior to a digitization and sum the second group of detector pixels including to sum at least two pixels in the second group of photodetector pixels in the analog domain prior to another digitization.

10. The system of claim 9, wherein the control circuitry is configured to subtract at least one photodetector pixel from the first group of photodetector pixels and add at least one photodetector pixel to the first group of photodetector pixels to form the second group of photodetector pixels.

11. The system according to claim 9, wherein the received portion of the second light beam has an area corresponding to M photodetector pixels and the first group of photodetector pixels and the second group of photodetector pixels include M+1 detector pixels, and the photodetector includes N detector pixels, where N is greater than M+1.

12. The system according to claim 9, wherein the summing circuitry is configured to sum every pixel in the first group of photodetector pixels prior to the digitization and sum every pixel in the second group of photodetector pixels prior to the other digitization.

13. The system according to claim 9, wherein the summing circuitry is configured to sum at least two pixels or summed pixel groups in the first group of photodetector pixels after the digitization and sum at least two pixels or summed pixel groups in the second group of photodetector pixels after the other digitization.

14. A method for dynamically adjusting a composite field of view in an optical detection system, the method comprising:

scanning a first light beam over a target region in a pattern and recording positions of the detected first light beam using a count N of detector pixels;

transmitting a second light beam towards the target region;

in response to the second light beam, receiving a responsive light beam from the target region onto a first group of pixels comprising a first composite field of view;

summing the first group of detector pixels including summing at least two pixels in the first group of pixels in the analog domain prior to a digitization;

adjusting an angle of the transmitted second light beam and, based on the adjusted angle of the transmitted second light beam, removing at least one pixel from the first group of pixels and adding at least one pixel to the first group of pixels to form a second group of pixels comprising a second composite field of view, including using recorded positions of the first light beam;

transmitting the second light beam towards the target region at the adjusted angle and receiving a responsive light beam from the target region onto the second group of pixels comprising the second field of view, a count of the first group of detector pixels and a count of the second group of detector pixels being less than the count N; and summing the second group of detector pixels including summing at least two pixels in the second group of pixels in the analog domain prior to another digitization.

15. The method of claim 14, further comprising:
sequentially scanning the second light beam across the target region; and
determining at least one angle of the second light beam at which a received portion of the transmitted second light beam is aligned with a boundary of at least two pixels.

16. The method according to claim 14, wherein the at least one angle of second light beam is determined when a center of a received portion of the transmitted second light beam is aligned with a boundary of at least two pixels.

17. The method of claim 1, wherein summing at least two pixels in the first group of detector pixels in the analog domain prior to digitization comprises summing respective currents from the at least two pixels in the first group of detector pixels; and wherein summing at least two pixels in the second group of detector pixels in the analog domain prior to another digitization comprises summing respective currents from the at least two pixels in the second group of detector pixels.

18. The system according to claim 9, wherein the summing circuitry is configured to sum respective currents from the at least two pixels in the first group of photodetector pixels prior to digitization and configured to sum respective currents from the at least two pixels in the second group of photodetector pixels prior to the other digitization.

* * * * *